United States Patent
Bender

(10) Patent No.: US 7,013,914 B2
(45) Date of Patent: Mar. 21, 2006

(54) THROTTLE VALVE

(75) Inventor: Steffen Bender, Herborn (DE)

(73) Assignee: Reich KG-Regel-und Sicherheitstechnik, Eschenburg-Wissenbach (DE)

( * ) Notice: Subject to any disclaimer, the term of this patent is extended or adjusted under 35 U.S.C. 154(b) by 186 days.

(21) Appl. No.: 10/603,072

(22) Filed: Jun. 24, 2003

(65) Prior Publication Data
US 2004/0035470 A1  Feb. 26, 2004

Related U.S. Application Data

(63) Continuation-in-part of application No. 10/194,416, filed on Jul. 12, 2002, now Pat. No. 6,736,165.

(30) Foreign Application Priority Data
Jul. 13, 2001 (DE) .......................... 201 11 656 U

(51) Int. Cl.
F16K 37/00 (2006.01)

(52) U.S. Cl. .................. 137/556; 137/887; 73/861.74; 251/208

(58) Field of Classification Search ................ 137/883, 137/887; 251/208; 73/861.74, 715
See application file for complete search history.

(56) References Cited

U.S. PATENT DOCUMENTS 3,812,882 A * 5/1974 Taylor ..................... 137/556.6
4,048,855 A * 9/1977 Sejournet ..................... 73/299
5,308,040 A * 5/1994 Torres ......................... 251/208
6,273,132 B1 * 8/2001 Chrysler et al. ....... 137/625.31

FOREIGN PATENT DOCUMENTS

| CH | 688 834 A5 | 4/1998 |
|---|---|---|
| DE | 196 08 780 A1 | 9/1996 |
| DE | 298 04 151 U1 | 8/1999 |
| DE | 298 06 215 U1 | 9/1999 |
| DE | 299 05 655 U1 | 9/1999 |
| EP | 0797 080 A2 | 9/1997 |
| EP | 0 789 821 B1 | 1/2001 |

* cited by examiner

Primary Examiner—John Fox
(74) Attorney, Agent, or Firm—Womble Carlyle Sandridge & Rice, PLLC

(57) ABSTRACT

The present invention relates to a throttle valve, particularly for controlling a liquid flow in a central heating or an air conditioning system, with a flow control unit having a first and a second element (18, 30), which are movably mounted relative to each other for setting a desired flow, characterised in that the first element (18) is designed as a first disc, and the second element (30) is designed as a second disc, and that the first and the second disc (18, 30) are mounted tight on each other in such a way that the first disc (18) may be rotated relative to the second disc (30), the first disc (18) exhibiting at least one first flow aperture (36) and the second disc (30) exhibiting at least one second flow aperture (38), the desired flow being adjustable through the degree of overlapping of the at least one first flow aperture (36) and the at least one second flow aperture (38), the at least one first and the at least one second flow aperture (36, 38) being designed such that, by rotating the first disc (18) relative to the second disc (30) a continuous, particularly linear, square or exponential increase in the flow is achievable.

13 Claims, 2 Drawing Sheets

THROTTLE VALVE

CROSS-REFERENCE TO RELATED APPLICATIONS

This application is a continuation-in-part of patent application Ser. No. 10/194,416, filed Jul. 12, 2002 now U.S. Pat. No. 6,736,165. The entire disclosure of application Ser. No. 10/194,416 is considered to be part of the present specification and is hereby incorporated by reference herein. This application also claims the benefit of German utility patent application serial number 201 11 656.1, filed Jul. 13, 2001. The entire disclosure of German application serial number 201 11 656.1 is considered to be part of the present specification and is hereby incorporated by reference herein.

FIELD OF THE INVENTION

The present invention relates to a throttle valve, particularly for controlling a liquid flow in a central heating or an air conditioning system, with a flow control unit having a first and a second element which are movably mounted relative to each other for setting a desired flow.

BACKGROUND OF THE INVENTION

A throttle valve of this kind is known from DE 298 06 215 U1. There, the flow is controlled by having at least one flow-limiting aperture arranged in the wall of the bushing, which can be made to be congruent with a flow-limiting aperture arranged in the wall of a sleeve and connected to the header pipe, or be closed off in whole or in part.

Moreover, there is known from EP 0 797 080 a flow regulating valve with a flow meter, on which the valve-closing body exhibits a control edge which co-acts with the valve seat at the outlet nozzle, thus controlling the outlet cross-section.

Finally, EP 0 789 821 shows a valve device, particularly for controlling the liquid flow rate in a central heating or air conditioning system, in which two discs can be rotated against each other in 45-deg. steps for flow control. The apertures are neither tapering nor circular and do not allow a linear flow increase through a rotation of the two discs against each other. Instead, only pre-set flows, which result from combinations of the different openings of the one disc with the different openings of the other disc, can be achieved therewith; see table in FIG. 2 of said document. Practice has shown that it is not possible to achieve satisfactory regulation results therewith.

SUMMARY OF THE INVENTION

The present invention is therefore based on the object of improving the aforementioned throttle valve in such a way that an improved setting of the desired flow is made possible.

This object is achieved with a throttle valve operating between and including a "closed" position and an "open" position, particularly for controlling a liquid flow in a central heating or an air conditioning system, said valve comprising a flow control unit having a first and a second element which are movably mounted relative to each other for setting the desired flow, the first element being designed as a first disc, and the second element being designed as a second disc, and the first disc and the second disc being mounted tight on each other in such a way that the first disc may be rotated relative to the second disc, the first disc exhibiting at least one first flow aperture and the second disc exhibiting at least one second flow aperture, wherein the desired flow is adjustable through the degree of overlapping of the at least one first flow aperture and the at least one second flow aperture, and the at least one first flow aperture and the at least one second flow aperture being designed such that by rotating the first disc relative to the second disc a continuous, particularly linear, square or exponential, increase in the flow is achievable.

The invention is based on the realisation that satisfactory regulation results are realisable when the first and the second flow aperture are designed so that, by rotating the fist disc relative to the second disc, a continuous flow increase is achievable. This allows setting any desired intermediate steps for the flow, and the user is not restricted to the setting of a predetermined flow rate.

In a preferred embodiment this is achieved by having the first and/or the second flow aperture designed as an aperture extending concentrically with respect to the axis of rotation. With this measure, only one aperture needs to be provided, which results in a simplification of the steps required for fabrication and hence in a reduction in cost, while also not requiring complicated calculations, see the aforementioned EP 0 789 821, to be able to realise the setting of desired flow rates. Preferably, for this, the first or the second flow aperture is tapered. Owing to the fact that the width of the aperture practically increases or decreases along its concentric extension around the axis of rotation, any desired flow can be set precisely.

Alternatively, the at least one first flow aperture and/or the at least one second flow aperture can comprise at least one circular or oval aperture, preferably a plurality of circular and/or oval apertures of different sizes.

The flow control unit preferably comprises a rotation device, which is connected to the first disc in such a way that, by rotating the rotating device, the first disc is rotatable relative to the second disc. The rotation device can be designed so that it can be rotated manually by a user. In a preferred embodiment the rotation device is designed as a hexagon socket so that it can be rotated by a user using an Allen key. A preferred alternative is the provisioning of a slotted or a crossed recess for rotating with a screwdriver, or knurling for manual rotation without a tool.

Preferably, the second rotating disc is fixedly arranged in the end piece which is arranged on the other side of the pipe from which, by means of the throttle valve according to the present invention, a liquid flow to be regulated is branched off or piped back, e.g. in a heating circuit manifold.

A particularly simple installation results if the rotation device is connected with the first disc via a rotatably arranged pipe, it being possible for the pipe to be designed to comprise at least two parts, the individual parts being connectable through a bolt mechanism and/or through a plug-in mechanism, which results in a particularly simple installation. Preferably, the plug-in mechanism comprises a claw coupling and/or a block gear device.

Said pipe can exhibit a first pipe aperture through which the liquid can flow into the pipe, and a second pipe aperture through which the liquid can flow out of the pipe, the first disc being arranged at the first or at the second pipe aperture.

An especially preferred variant is characterised in that at least one sealing device is arranged in the second disc in such a way that, in the "closed" position of the throttle valve, the at least one flow aperture of the first disc is sealed off by the sealing device. This ensures that particularly in the "closed" position of the throttle valve a particularly good seal is achieved. While in all other positions of the throttle valve an additional flow portion due to minor leakage does not cause any damage because it has the effect of a changed throttle valve position, such additional flow is undesired in the "closed" position of the throttle valve, for example during repair work, cleaning work and the like on the connected line.

Preferably, the sealing device is designed as at least one sealing ring which, in the "closed" position of the throttle valve, is arranged concentrically with respect to at least one flow aperture of the first disc. A particularly perfect seal can be achieved if a stop is additionally provided in order to accurately position the first disc with respect to the second disc in the "closed" position. Particularly in connection with the aforementioned sealing device, this allows ensuring that the flow aperture of the first disc actually comes to rest suitably aligned with respect to the sealing device arranged in the second disc.

A whole series of further embodiments is characterised in that, furthermore, a flow measuring unit is arranged in the throttle valve according to the present invention, the flow measuring unit for measuring flow preferably exhibiting a measuring body movably arranged in the or a further pipe through which the liquid flows. This way it is possible to set a desired flow directly at the throttle valve by rotating the two discs against each other, the measuring body directly or indirectly reflecting the set flow.

Preferably, the measuring body is connected to a spring element exerting a spring force against to the direction of flow of the liquid within the or a further pipe. The use of a spring element allows a location-independent installation of a throttle valve according to the present invention, it being possible for the measuring body to be connected to the spring element via a rod, the rod and/or the spring element being arranged within the or the further pipe.

The spring element or the rod or the measuring body can be connected to a pointer of an indication unit for flow indication, or can themselves indicate the flow, particularly if the or the further pipe are at least partially designed transparently. Owing to this simple mechanical solution, no electrical connections are required to indicate the flow.

Further advantageous embodiments of the invention may be taken from the sub-claims.

BRIEF DESCRIPTION OF THE DRAWINGS

In the following, an embodiment of the invention is described in more detail with reference to the drawings attached, which show in FIG. 1 a schematic, partly sectional view of an embodiment of a throttle valve according to the present invention, on the left in an almost fully open valve position, on the right in an almost fully closed valve position.

DETAILED DESCRIPTION

Figure 1:
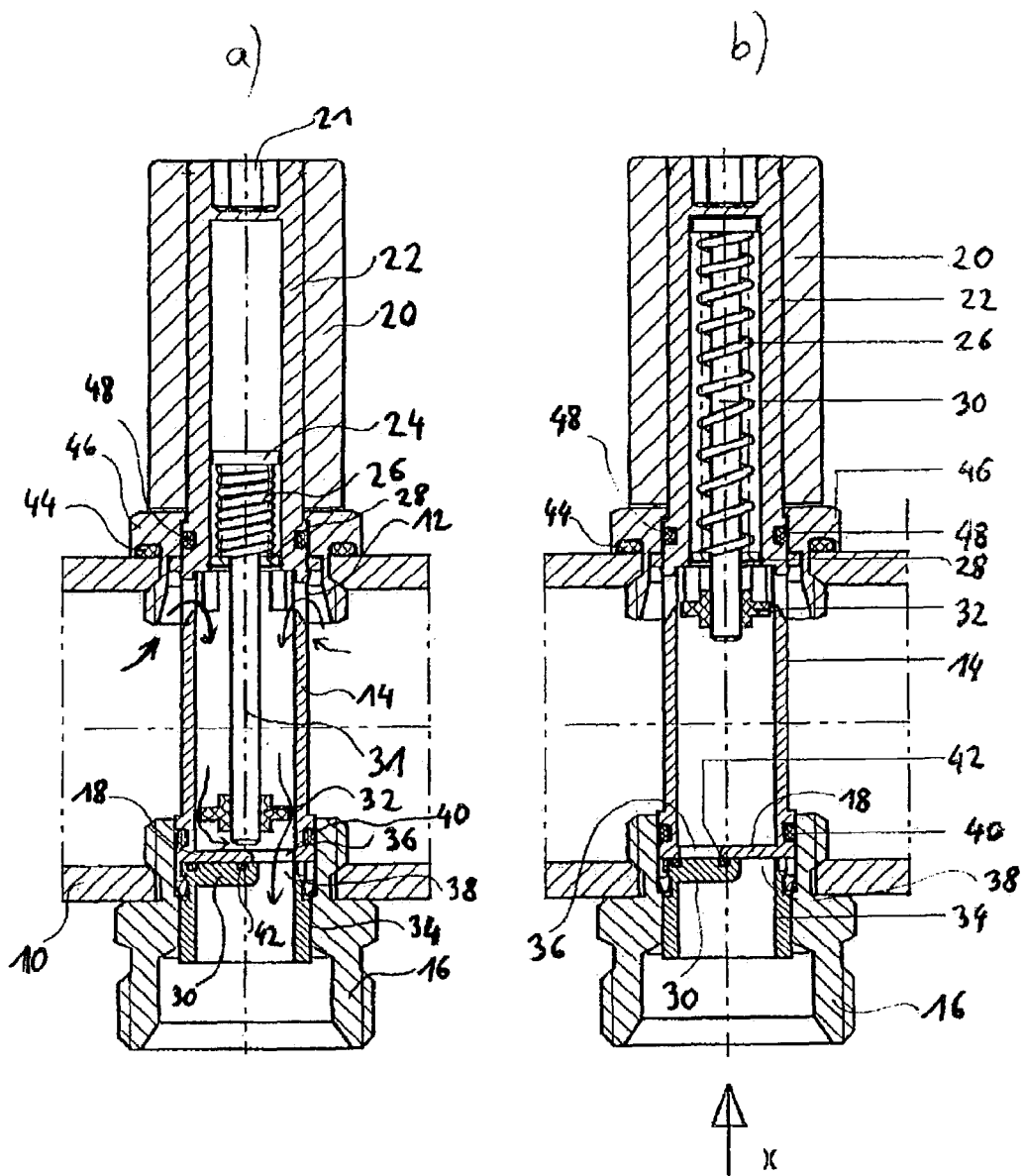

FIG. 1 shows a throttle valve according to the present invention, on the left in an almost fully open valve position, on the right in an almost fully closed valve position. In the open position, depending on the set flow rate, liquid, which is carried in the main pipe 10, flows through a first aperture 12 in a centre pipe 14—as illustrated by the arrow —into a branch-off line that may be connected to the end piece 16.

Even if in the present case the throttle valve according to the present invention is shown using the example of a supply branch line, it is a matter of course for a person skilled in the art that a corresponding use is also possible in a return branch line. The centre pipe 14 is firmly connected to a disc 18, the pipe 14 and hence the disc 18 being coupled to a rotation device 21, in the present case a hexagon socket, in such a way that by rotating the rotating device 21 disc 18 can be rotated. Preferably a sleeve 20 carries a scale and, like the measurement pipe 22, is at least partially designed transparently so that the position of a measuring body 24, which corresponds to the currently set flow rate, can be read from the outside. Alternatively, a partial opening may be provided in the sleeve 20, to expose the measuring body 24 to a view through the transparent measurement pipe 22. If the optional sleeve 20 is dispensed with, a scale may be provided on the measurement pipe 22. The measurement pipe 22 and the centre pipe 14 are coupled to each other by way of a plug-in mechanism with a claw coupling in such a way that a rotation of the rotating device 21 is translated into a rotation of the disc 18. Via a spring device 26, which braces itself against a stop 28, the measuring body 24 is guided on a pin-shaped element 31, which carries on its other end a flow disc 32, onto which is admitted the liquid which flows through the pipe 14. The larger the amount of liquid flowing through the pipe 14, the further the flow measurement disc 32 is pulled out of the measurement pipe 22 against the force of the spring device 26, and the further down inside the measurement pipe 22 is the measuring body 24. A second disc 30 is firmly connected to the pipe section 34, which is fixed in the end piece 16. The first disc 18 exhibits a first flow aperture 36, the second disc 30 a second flow aperture 38. An o-ring 40 serves to seal the centre pipe 14 off from the end piece 16. On the side of the disc 30, which faces the disc 18, there is arranged another o-ring 42, which will be described in more detail with reference to the other figures. Two further o-rings 44, 48, serve to seal off on the one hand the pipe accommodation unit 46 from the main pipe 10 and/or the pipe accommodation unit 46 from the measurement pipe 22. In addition, there is provided inside the throttle valve according to the present invention a stop, which allows an accurate setting of the rotatably mounted disc 18 with respect to the fixed disc 30 in the position in which there is no flow through the throttle valve. A stop of such kind can be provided at any position where a fixed unit and a rotatably mounted unit meet, for example as projections and/or recesses on/in the two discs 18, 30.

Figure 2:
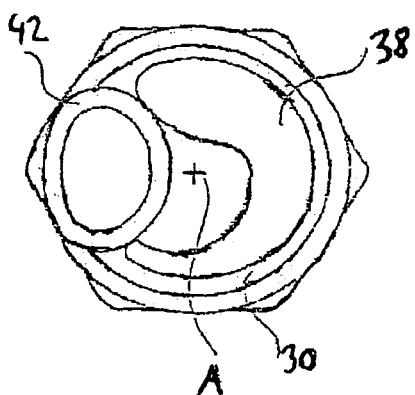
FIG. 2 a plan view of the fixed disc.
Figure 3:
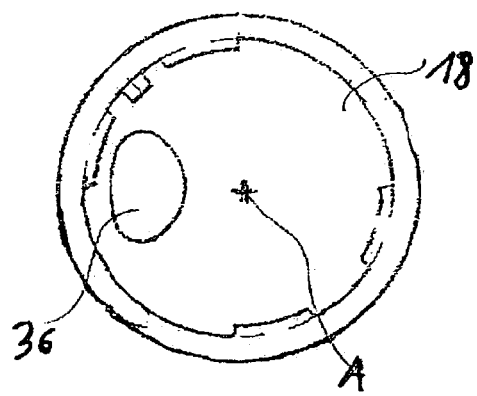
FIG. 3 a plan view of the rotatably arranged disc.

FIG. 2 shows a plan view of the fixed disc 30 with a flow aperture 38 continuously tapering around an axis of rotation. Moreover, the o-ring 42 can be recognised whose inner shape corresponds to the flow aperture 36 in the first disc 18 as shown in FIG. 3. The axis of rotation of the fixed and the rotatably mounted discs 30, 18 is designated as A in FIGS. 2 and 3.

Figure 4:
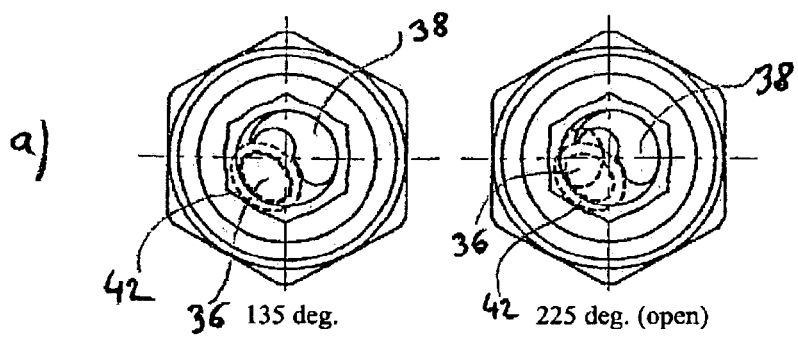
FIG. 4 a plan view from the bottom in the direction of the X arrow in FIG. 1, at different positions of the fixed disc and the rotatably arranged disc with respect to each other.
Figure 4:
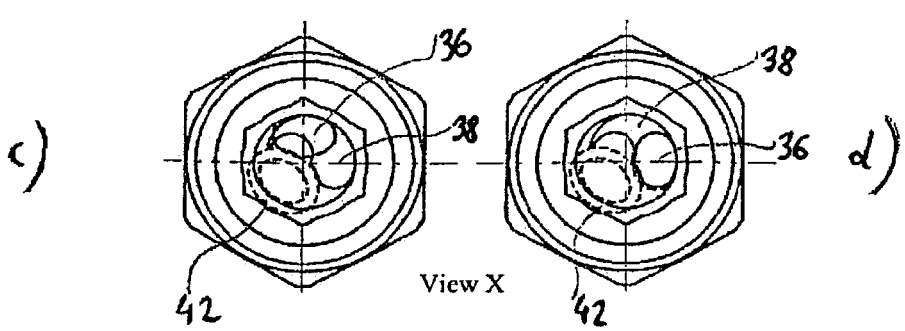

FIG. 4 shows the relative position of the two discs 30, 18 with respect to each other at different degrees of rotation: in FIG. 4a the angle of rotation is 0 degrees, the throttle valve according to the present invention is in the "closed" position. The flow aperture 36 of the rotatably mounted disc 18 is precisely within the surface area limited by the sealing ring 42. FIG. 4b shows the position at a rotation of 45 degrees, FIG. 4c at a rotation of 135 degrees and FIG. 4d at a rotation of 225 degrees, which corresponds to the "open" position of the throttle valve. Optionally, for this, too, another stop may be provided which ensures that the "open" position is found in a simple way.

While certain, selected embodiments of the present invention have been disclosed herein, other embodiments of the apparatus and methods of the present invention will suggest themselves to persons skilled in the art in view of this disclosure. Therefore, it will be understood that variations and modifications can be effected within the spirit and scope of the invention and that the scope of the present invention should only be limited by the claims.

What is claimed is:

1. Throttle valve, operating between and including a "closed" position and an "open" position for controlling a liquid flow in a central heating or an air conditioning system, said valve comprising:
   a flow control unit having a first disc and a second disc which are movably mounted relative to each other for setting the desired flow, and which are mounted tight on each other in such a way that said first disc may be rotated relative to said second disc,
   said first disc exhibiting at least one first flow aperture and said second disc exhibiting at least one second flow aperture,
   wherein the desired flow is adjustable through the degree of overlapping of said at least one first flow aperture and said at least one second flow aperture, and
   said at least one first flow aperture and said at least one second flow aperture being designed such that by rotating the first disc relative to the second disc a continuous increase in the flow is achievable, characterised in that said flow control unit comprises a rotation device connected, via a rotatably arranged pipe, with said first disc such that said first disc is rotatable by rotating the rotation device relative to said second disc, wherein the liquid flows through said pipe; and
   a flow measuring unit exhibiting a measuring body arranged in said pipe such as to be movable in and against the direction of the flow of the liquid within said pipe.

2. Throttle valve according to claim 1, characterised in that at least one of the group of said first and said second flow apertures is designed as an aperture extending concentrically with respect to the axis of rotation.

3. Throttle valve according to claim 1 or 2, characterised in that the first or the second flow aperture tapers.

4. Throttle valve according to claim 1, characterized in that the at least one of the group comprising a first flow aperture and a second flow aperture comprise at least one circular or oval aperture.

5. Throttle valve according to claim 1, characterized in that the pipe is designed to comprise at least two parts, the individual parts being connectable through a mechanism selected from the group consisting of a bolt mechanism and a plug-in mechanism.

6. Throttle valve according to one of the claim 1 or 5, characterised in that the pipe exhibits a first pipe aperture, through which the liquid can flow into the pipe, and that the pipe exhibits a second pipe aperture through which the liquid can flow out of the pipe, the first disc being arranged at the first pipe aperture.

7. Throttle valve according to claim 1, characterised in that in the second disc there is arranged at least one sealing device in such a way that, in the "closed" position of the throttle valve, the at least one flow aperture of the first disc is sealed off by the sealing device.

8. Throttle valve according to claim 7, characterised in that the sealing device is preferably designed as at least one sealing ring which, in the "closed" position of the throttle valve, is arranged concentrically relative to the at least one flow aperture of the first disc.

9. Throttle valve according to claim 1, characterised in that a stop is provided to position the first disc accurately with respect to the second disc in the "closed" position.

10. Throttle valve according to claim 1, characterised in that the measuring body is connected to a spring element which exerts a spring force against the direction of flow of the liquid within said pipe.

11. Throttle valve according to claim 10, characterised in that the measuring body is connected via a rod to the spring element.

12. Throttle valve according to claim 11, characterised in that at least one of the group comprising the rod and the spring element are arranged within said pipe.

13. Throttle valve according to claim 10, characterised in that the pipe exhibits a first pipe aperture, through which the liquid can flow into the pipe, and that the pipe exhibits a second pipe aperture though which the liquid can flow out of the pipe, the first disc being arranged at the second pipe aperture.

* * * * *